United States Patent
Koga et al.

(10) Patent No.: US 7,338,617 B2
(45) Date of Patent: Mar. 4, 2008

(54) PROCESS FOR PREPARING A FLOCCULANT FOR WATER TREATMENT

(75) Inventors: Yoshiaki Koga, Tokuyama (JP); Takao Hasegawa, Tokyo (JP); Hiroyuki Ookubo, Tokyo (JP)

(73) Assignee: Tokuyama Corporation (JP)

( * ) Notice: Subject to any disclaimer, the term of this patent is extended or adjusted under 35 U.S.C. 154(b) by 248 days.

(21) Appl. No.: 10/154,990

(22) Filed: May 24, 2002

(65) Prior Publication Data

US 2003/0019815 A1    Jan. 30, 2003

(30) Foreign Application Priority Data

May 25, 2001 (JP) .............................. 2001-157501
Mar. 7, 2002 (JP) .............................. 2002-061967

(51) Int. Cl.
*C02F 5/02* (2006.01)
*C02F 1/52* (2006.01)
*B01F 3/12* (2006.01)
*C01B 33/141* (2006.01)
*C01B 33/20* (2006.01)

(52) U.S. Cl. ...................... 252/179; 252/60; 210/716; 516/80

(58) Field of Classification Search ................ 252/179, 252/60; 210/716; 516/80
See application file for complete search history.

(56) References Cited

U.S. PATENT DOCUMENTS

| | | | |
|---|---|---|---|
| 3,139,406 A | * | 6/1964 | Mindick et al. ............... 516/80 |
| 3,252,917 A | * | 5/1966 | Mindick et al. ............... 516/80 |
| 4,923,629 A | | 5/1990 | Hasegawa et al. |
| 5,227,089 A | * | 7/1993 | Hasegawa et al. ........... 252/181 |
| 5,607,552 A | | 3/1997 | Andersson et al. |

FOREIGN PATENT DOCUMENTS

| | | | |
|---|---|---|---|
| EP | 0340 353 A1 | * | 11/1989 |
| EP | 0 479 218 A1 | * | 9/1991 |
| GB | 1 012 892 A | | 12/1965 |
| JP | 61-227915 A | | 10/1986 |
| JP | 4054619 B2 | | 10/1986 |
| JP | 2732067 B2 | | 11/1989 |
| JP | 8-333112 A | | 12/1996 |
| JP | 2001-070708 A | | 3/2001 |
| WO | WO 98/56715 A1 | | 12/1998 |
| WO | WO 00/66491 A1 | | 11/2000 |

* cited by examiner

*Primary Examiner*—Daniel S. Metzmaier
(74) *Attorney, Agent, or Firm*—The Webb Law Firm, P.C.

(57) ABSTRACT

The invention provides metal-silica polymeric flocculants having high coagulation performance which are used for water treatment, particularly to remove suspended materials and other impurities from irrigation water, waste water or the like. A silica sol having a $SiO_2$ concentration of from 100 to 200 g/L and a viscosity of less than 6 cp is prepared by colliding an inorganic acid aqueous solution with a silicate aqueous solution at each rate of 5 m/sec or more. The silica sol is aged to make an aged silica sol having a viscosity of 6 to 30 cp, and the aged silica sol is mixed with a water-soluble metal salt such as ferric chloride, to prepare the flocculants.

8 Claims, 2 Drawing Sheets

PROCESS FOR PREPARING A FLOCCULANT FOR WATER TREATMENT

BACKGROUND OF THE INVENTION

1. Field of the Invention

The present invention relates to a process for preparing a flocculant for water treatment, and more particularly to a simple and low-cost process for preparing a flocculant for water treatment having high treatment capability.

2. Description of the Prior Art

Purification of irrigation water or wastewater to remove suspended substances and other impurities is made by such a water-treatment process as pouring a flocculant into irrigation water or wastewater to coagulate and deposit the impurities for removal. The flocculants used for this purpose include aluminum sulfate, polyaluminum chloride and ferric chloride.

Of the flocculants, aluminum sulfate and polyaluminum chloride are widely used. However, because aluminum is an amphoteric metal, the aluminum causes a problem in that it remains in treated water as soluble aluminum coordinating with an organic substance in the water, e.g., an organic acid produced by algae. Also, aluminum flocculants cannot achieve as high coagulation performance at low water temperatures and, therefore, need to be poured in excess.

In order to solve the above problems, attentions are now drawn to metal-silica inorganic polymer flocculants which are prepared by adding a water-soluble metal salt, such as an iron salt, to polymerized silicate, in particular an iron-silica inorganic polymer flocculant in which the metal salt is an iron salt, because of their high and stable coagulation performance and nontoxicity.

Such flocculants are disclosed in, for instance, JP-B-4 (1992)/75796 and Japanese Patent No. 2,732,067, which are obtained by adding a silicate aqueous solution to such an inorganic acid aqueous solution as of hydrochloric acid or sulfuric acid in a container, e.g., a beaker, to prepare a silica sol having an $SiO_2$ concentration of about 1 to 6%, then aging the silicate aqueous solution at around room temperature for several hours with stirring to proceed polymerization, and adding such a metal salt aqueous solution as of an iron salt to the solution.

The metal-silica inorganic polymer flocculants produced by the above process realize high coagulation performance and have a long gel time, maintaining its flocculating properties in spite of a long-term storage. Also, they exhibit high coagulation performance even at low water temperatures and provide many other advantages as a water treatment agent.

However, the silica sol produced according to the above method by adding a silicate aqueous solution to an inorganic acid aqueous solution cannot have an $SiO_2$ concentration higher than 70 g/L (a little under about 7%), because partial non-uniformity occurs extremely easily in a mixture of the silicate aqueous solution and the inorganic acid aqueous solution and the non-uniform portions start immediately gelling to make it impossible to obtain a uniform silica sol in an attempt of high-concentration silica sol preparation. Accordingly, the concentration of $SiO_2$ has to be set low in order to produce the flocculants having good flocculating properties, which lowers productivity.

Moreover, to improve the flocculating properties of the metal-silica inorganic polymer flocculants and to realize practical coagulation performance, the silica sol needs to be aged while being heated to about 60° C. at the time of aging (thereby the polymerization of silicate proceeds and the molecular weight of silicate increases). Therefore, a heating apparatus is required and costs for industrial production are accordingly raised.

This is the reason why the metal-silica inorganic polymer flocculants have not been practically used in industries in spite of their various advantages mentioned above.

Therefore, a process has been desired which can produce a metal-silica inorganic polymer flocculant exhibiting excellent coagulation performance, without involving any specific apparatuses, at low cost and in large quantities.

In order to solve the above problems, the present inventors made an earnest study focusing on the process of preparing a uniform and high-concentration silica sol disclosed in JP-B-4(1992)/54619. As the result of their additional study, there have been revealed that a silica sol, which is prepared by an applied process derived from the above publication, and aged to have a specific viscosity, is useful as a raw material to produce the metal-silica inorganic polymer flocculant.

The present inventors further studied on the viscosity of the silica sol, the $SiO_2$ concentration in the silica sol and flocculating properties of the resulting flocculant and, as a result, completed the present invention.

SUMMARY OF THE INVENTION

Specifically, the present invention concerns a process for preparing a flocculant for water treatment, comprising the steps of aging a silica sol having an $SiO_2$ concentration of from 100 to 200 g/L and a viscosity of less than 6 cp to prepare a silica sol having an $SiO_2$ concentration of from 100 to 200 g/L and a viscosity of from 6 to 30 cp, and mixing the silica sol with a water-soluble metal salt.

Another presently preferred embodiment of the invention relates to a process for preparing a flocculant for water treatment, comprising the steps of aging a silica sol having an $SiO_2$ concentration of from 100 to 200 g/L and a viscosity of less than 6 cp to prepare a silica sol having an $SiO_2$ concentration of from 100 to 200 g/L and a viscosity of from 6 to 30 cp, diluting the silica sol with water to prepare a silica sol having an $SiO_2$ concentration of from 50 to 70 g/L, and mixing the silica sol with a water-soluble metal salt.

In the above processes, it is preferred that the silica sol having an $SiO_2$ concentration of from 100 to 200 g/L and a viscosity of less than 6 cp be a silica sol prepared by colliding an inorganic acid aqueous solution with a silicate aqueous solution at each rate of 5 m/sec or more.

The present invention also provides an apparatus for preparing a flocculant for water treatment, which is suitable to conduct any of the above processes, comprising (a) a storage tank for an inorganic acid aqueous solution, (b) a storage tank for a silicate aqueous solution, (c) a storage tank for a metal salt aqueous solution, (d) a collision device for preparing a silica sol by colliding the inorganic acid aqueous solution stored in the inorganic acid aqueous solution storage tank with the silicate aqueous solution stored in the silicate aqueous solution storage tank at each rate of 5 m/sec or more, (e) a stirring and aging device for aging the silica sol obtained by the collision with stirring and (f) a feeding device for feeding the metal salt aqueous solution stored in the metal salt aqueous solution storage tank in order to mix the metal salt aqueous solution with the silica sol drawn from the stirring and aging device.

BRIEF DESCRIPTION OF THE DRAWINGS

FIG. 2 is a view showing a whole structure of an apparatus for producing a flocculant for water treatment, which can be transported by a truck or the like.

DETAILED DESCRIPTION OF THE INVENTION

Figure 1:
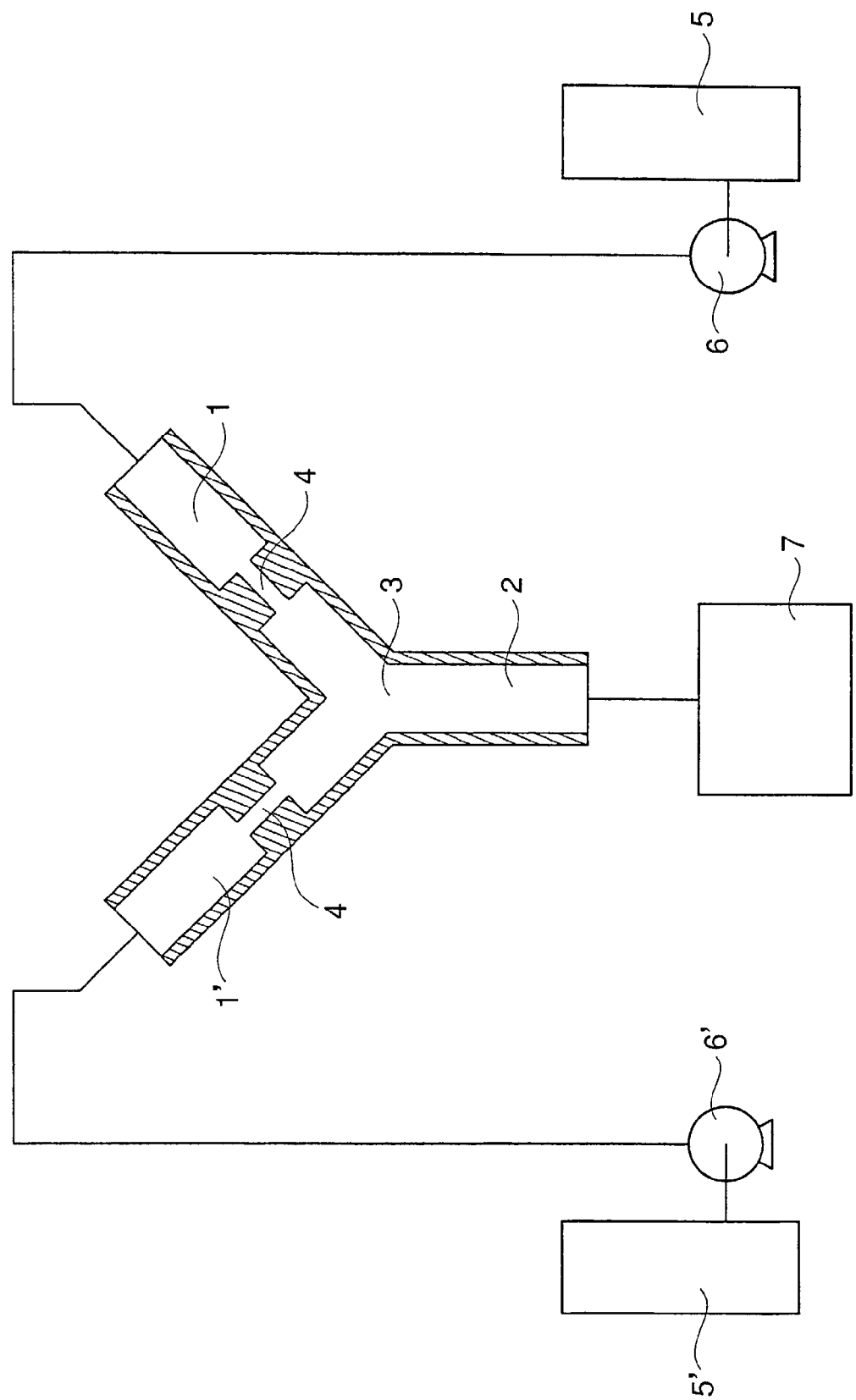
FIG. 1 is a view showing a Y-shaped apparatus used for colliding an inorganic acid aqueous solution with a silicate solution at each rate of 5 m/sec or more.

The process of the present invention necessarily comprises a step of aging a silica sol having an $SiO_2$ concentration of from 100 to 200 g/L and a viscosity of less than 6 cp (such a silica sol will sometimes be referred to as "raw silica sol" hereinafter) (the step to proceed the polymerization of silicate) to prepare a silica sol having an $SiO_2$ concentration of from 100 to 200 g/L and a viscosity of from 6 to 30 cp (such a silica sol will sometimes be referred to as "aged silica sol" hereinafter).

A silica sol having an $SiO_2$ concentration of less than 100 g/L or exceeding 200 g/L is unfavorable to use as the raw silica sol because the resulting flocculant will have such inferior flocculating properties as requiring a long time to coagulate and deposit suspended substances. A silica sol having an $SiO_2$ concentration of less than 100 g/L requires an extremely long time of aging (mentioned later) to reach a viscosity of from 6 to 30 cp and is produced only in a small amount per batch, thereby lowering the productivity.

In order to rapidly and highly coagulate the suspended substances when adding the flocculant into the water to be treated, the raw silica sol is preferably a silica sol having an $SiO_2$ concentration of from 140 to 160 g/L.

Practically, the silica sol having a viscosity of 6 cp or more cannot be obtained without aging. Therefore, a silica sol having a viscosity of less than 6 cp is used as the raw silica sol. In order to obtain a flocculant of high flocculating properties, the raw silica sol preferably has a viscosity of 5 cp or less.

The viscosity of the silica sol is determined with a rotational viscometer at 20° C.

The process for producing a silica sol having the concentration and the viscosity specified above is not particularly limited. The production can be made by such a process as contacting an inorganic acid aqueous solution with a silicate aqueous solution at a certain rate or over, which is disclosed in JP-B-4(1992)/54619, pouring a silicate aqueous solution and sulfuric acid into a flow of water, which is disclosed in JP-A-8(1996)/333112, or by hydrolysis of alkyl silicate under acid or alkali conditions, or by electrodialysis of a silicate aqueous solution with an ion-exchange membrane.

Of these processes, colliding an inorganic acid aqueous solution with a silicate aqueous solution at a certain rate or over is highly suitable because production equipments are simple, the raw silica sol can be produced at a low production cost due to the low costs for raw materials and running, and the silica sol having the above-range concentration and viscosity can be stably produced.

To detail the above process, an inorganic acid aqueous solution, such as of sulfuric acid or hydrochloric acid, is collided with a silicate aqueous solution at each flow rate of at least 5 m/sec, preferably at least 7 m/sec, more preferably at least 10 m/sec. In the process, both the inorganic acid aqueous solution and the silicate aqueous solution need to have the above flow rate. If one or both of them have a flow rate below the above range, gelation arises partially to make it difficult to obtain a uniform sol.

The concentration of the inorganic acid, which is used in preparing the raw silica sol, is preferably from 2 to 7 N, more preferably from 3 to 6 N. By regulating the concentration in this range, the concentration of the resulting silica sol can be readily set at from 100 to 200 g/L and the viscosity less than 6 cp, and the time required for aging (mentioned later) can be limited within the range of 5 minutes to 20 hours, which is industrially appropriate to conduct for aging.

As the silicate aqueous solution, a sodium silicate aqueous solution is preferably used and the concentration of $SiO_2$ in the solution is preferably from 200 to 350 g/L, more preferably from 250 to 300 g/L. By regulating the concentration in this range, the concentration of the resulting silica sol can be readily set at from 100 to 200 g/L and proceeding of gelation can be prevented while the silicate aqueous solution is being mixed (collided) with the inorganic acid aqueous solution, thereby making it easy to obtain a uniform silica sol.

The sodium silicate aqueous solution generally has a molar ratio of $SiO_2$ and $Na_2O$, ranging from 2.5 to 4.

A preferable apparatus for colliding the inorganic acid aqueous solution with the silicate aqueous solution is illustrated in FIG. 1 as a Y-shaped apparatus. Specifically, the inorganic acid aqueous solution and the silicate aqueous solution are sent from raw material storage tanks 5, 5' via pumps 6, 6' to raw material feeding pipes 1, 1' and accelerated through choke sections, 4, 4' to collide with each other at a reaction section 3. The silica sol generated at the reaction section 3 is sent to a sol storage tank 7 through a sol discharge pipe 2. The silica sol (raw silica sol) is aged and mixed with a water-soluble metal salt (mentioned later).

The size of the apparatus is appropriately selected. Generally, the raw material feeding pipes 1, 1' have a diameter of about 5 to 40 mm and a length of about 1.5 to 6 times greater than the diameter. The choke sections 4, 4' have a diameter of about 0.5 to 6 mm and a length of about 0.5 to 5 times greater than the diameter. The sol discharge pipe 2 has a diameter of about 5 to 20 mm and a length of about 10 to 100 mm. Therefore, the Y-shaped apparatus, as a whole, can be such an extremely small apparatus as having a width of about 40 to 100 mm, a height of about 40 to 150 mm and a thickness of about 2 to 70 mm.

The silica sol produced by the above process, having an $SiO_2$ concentration of 100 to 200 g/L, has a viscosity of usually about 2 to 5 cp immediately after produced (prior to aging) depending on the $SiO_2$ concentration in the silica sol.

The silica sol produced by the above process, having an $SiO_2$ concentration of 100 to 200 g/L and a viscosity of less than 6 cp, needs to be aged, that is, the polymerization of silicate has to be conducted to make the viscosity in the range of 6 to 30 cp.

The aging temperature, although not particularly limited to, is generally set at room temperature (about 15 to 40° C.) when the raw silica sol has an $SiO_2$ concentration of 100 to 200 g/L. The temperature needs not to be kept constant as long as it is in this range. That is, the use of the raw silica sol having the above concentration can decrease the production costs because the silica sol can be aged without any extra heating apparatus (thermostat).

The aging time is usually from 20 minutes to 4 hours, preferably from 40 to 220 minutes depending on the aging temperature and the $SiO_2$ concentration and the viscosity of the raw silica sol. When the raw silica sol having an. $SiO_2$ concentration of 140 to 160 g/L and a viscosity of about 5 cp is aged at a temperature of about 20 to 35° C., the viscosity can reach 6 to 30 cp in 30 to 200 minutes.

The silica sol which has not been aged or aged insufficiently so as to have a viscosity as low as less than 6 cp cannot make a flocculant having good flocculating properties when mixed with a later-mentioned water-soluble metal salt. The silica sol which is excessively aged to have a viscosity exceeding 30 cp cannot make a flocculant having good flocculating properties. The silica sol is preferably aged to have a viscosity in the range of 7 to 20 cp.

The aging of the raw silica sol is preferably conducted in a container, e.g., a sol storage tank, with gentle stirring.

Such silica sol that has not been aged in the above manner even if it has an $SiO_2$ concentration of 100 to 200 g/L and a viscosity of 6 to 30 cp cannot make a flocculant having sufficient flocculating properties when mixed with a water-soluble metal salt. The silica sol, even if having been aged, cannot make a flocculant having good flocculating properties either when the silica sol has been mixed with water or a low-viscosity silica sol to adjust the viscosity once raised over 30 cp in the range of 6 to 30 cp.

For example, the following cases produce a flocculant having insufficient flocculating properties:

when a silica sol having an $SiO_2$ concentration exceeding 200 g/L and a viscosity exceeding 30 cp is diluted with water to prepare a silica sol having an $SiO_2$ concentration of 100 to 200 g/L and a viscosity of 6 to 30 cp;

when a silica sol having an $SiO_2$ concentration of below 100 g/L and a viscosity of 6 to 30 cp is mixed with a silica sol having an $SiO_2$ concentration exceeding 200 g/L and a viscosity of 6 to 30 cp to prepare a silica sol having an $SiO_2$ concentration of 100 to 200 g/L and a viscosity of 6 to 30 cp; and when a silica sol having an $SiO_2$ concentration of 100 to 200 g/L and a viscosity exceeding 30 cp is mixed with a silica sol having the same concentration and a lower viscosity to prepare a silica sol having an $SiO_2$ concentration of 100 to 200 g/L and a viscosity of 6 to 30 cp.

The aged silica sol obtained in the above manner is mixed with a water-soluble metal salt to prepare a flocculant.

The water-soluble metal salt is not particularly limited and can be hydrochloride, nitrate or sulfate of any of iron, aluminum or magnesium. In view of safety for living things, flocculating properties of the flocculant and stability over a long-term storage, iron salts are preferable and ferric salts are more preferable. The most preferable water-soluble metal salts are ferric chloride and ferric sulfate.

The preferable amount of the water-soluble metal salt is variable depending on the type of the metal. When the metal is iron (Fe), the iron salt is added preferably in an amount such that the Si/Fe molar ratio is 0.1 to 5, more preferably in an amount such that the Si/Fe molar ratio is 0.5 to 3. When the metal is aluminum (Al), the aluminum salt is added preferably in an amount such that the Si/Al molar ratio is 2.5 to 15. When the metal is magnesium (Mg), the magnesium salt is added preferably in an amount such that the Si/Mg molar ratio is 2 to 10. The larger the Si/metal molar ratio is, the higher the coagulation performance is. The smaller the ratio is, the less likely the gelation occurs, resulting in excellent stability.

The water-soluble metal salt is preferably dissolved in water to obtain an aqueous solution and mixed with the aged silica sol and to attain uniform dispersion in the silica sol. When ferric chloride is used as the water-soluble metal salt, the concentration thereof in an aqueous solution is preferably in the range of 20 to 40% by weight.

When the water-soluble metal salt is mixed with the aged silica sol, the water-soluble metal salt (or an aqueous solution thereof) may be directly mixed with a silica sol, which is produced by the above process, having an $SiO_2$ concentration of 100 to 200 g/L and a viscosity of 6 to 30 cp. Otherwise, the water-soluble metal salt (or an aqueous solution thereof) is mixed with a silica sol which has been diluted with water until the $SiO_2$ concentration becomes 50 to 70 g/L, which is a more preferable fashion because the flocculant can have enhanced flocculation properties.

The silica sol which has been mixed with the water-soluble metal salt may be diluted again with water until the $SiO_2$ concentration becomes 10 to 30 g/L to be preferably used as a flocculant.

The flocculant obtained by mixing the aged silica sol with the water-soluble metal salt preferably has its pH adjusted to 1 to 3 for long-term storage stability. The pH adjusted in this range enables stable storage for several months. By contrast, the flocculant is more susceptible to gelation during storage as the pH approaches neutrality. Generally when the raw silica sol is prepared by the above-described method, that is, by colliding the inorganic acid aqueous solution with the silicate aqueous solution, the flocculant will have a pH of 1 to 3 without any specific adjustment. If the pH is outside the range, it is adjusted by addition of various acids, e.g., sulfuric acid, or various bases, e.g., sodium hydroxide.

The production apparatus for producing the flocculant for water treatment by the above process is not particularly limited. An appropriate combination is made according to necessity from among silica-sol production apparatuses, stirring and storage devices and devices for adding and mixing liquids that are conventionally known.

As mentioned earlier, the silica sol can be aged while having an $SiO_2$ concentration as high as 100 to 200 g/L and thereafter diluted with water or the like. This enables conducting the aging with a smaller device in comparison with the conventional cases. The aging can be conducted without a heating process, and therefore no apparatuses to heat the aging device are required. Accordingly, the aging device to age the silica sol can be readily transported by various transportation vehicles. The above feature makes it possible to age the raw silica sol having an $SiO_2$ concentration of 100 to 200 g/L during the transportation to the place where the flocculant for water treatment is used and to dilute the silica sol with the water supplied at the place. Resultingly the costs for transportation can be reduced by the costs for the water used for dilution. The above feature also makes it extremely easy to adjust the Si/metal molar ratio to optimize it for the water to be treated while observing the condition of the water to be treated with the flocculant.

By employing such an apparatus as the Y-shaped apparatus, which is described earlier as the production apparatus of the raw silica sol, for reacting the inorganic acid aqueous solution with the silicate solution by colliding them at each rate of 5 m/sec or more to prepare a silica sol, a section of the production apparatus for producing the raw silica sol can be miniaturized, which makes it possible to transport the production apparatus for producing a flocculant for water treatment including the production apparatus of the raw silica sol. This, in addition to an advantage of the transportable aging device for the silica sol, enables readily producing the flocculant for water treatment at any place, any time and in any amount needed to drastically reduce the production costs.

A preferred embodiment of the production apparatus that can be transported by various transportation vehicles is described in great detail with reference to the drawing attached.

Figure 2:
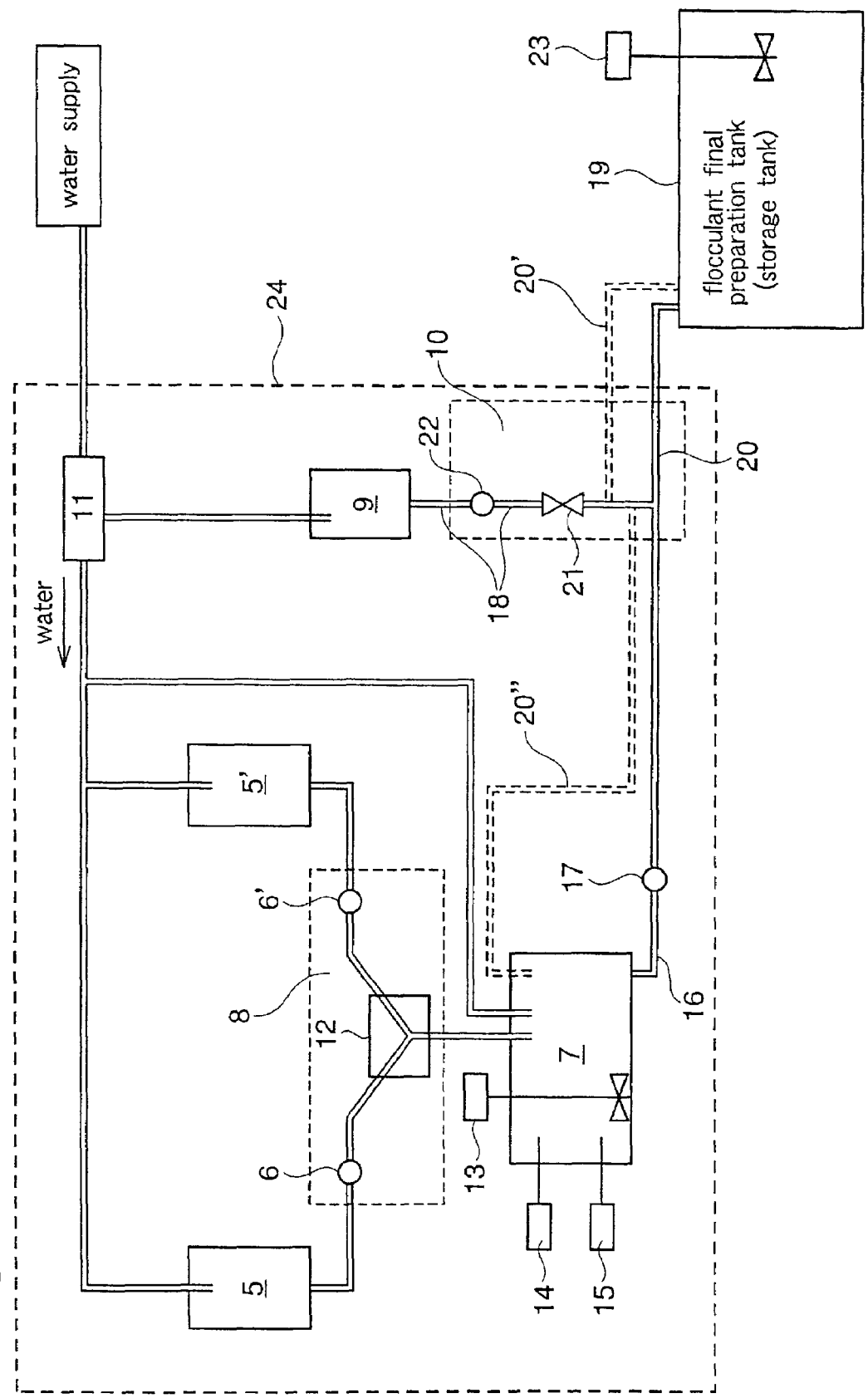

As shown in FIG. 2, the production apparatus comprises a storage tank 5 for the inorganic acid aqueous solution, a storage tank 5' for the silicate aqueous solution, a storage tank 9 for the metal salt aqueous solution (these three storage tanks are sometimes referred to generally as raw material storage tanks), a collision device 8 for reacting the inorganic acid aqueous solution stored in the inorganic acid aqueous solution storage tank with the silicate aqueous solution stored in the silicate aqueous solution storage tank by colliding them at a rate of 5 m/sec or more to prepare a silica sol, a stirring and aging device 7 for aging the silica sol obtained by the collision with stirring and a feeding device 10 for feeding the metal salt aqueous solution stored in the metal salt aqueous solution storage tank in order to mix the metal salt aqueous solution with the silica sol drawn from the stirring and aging device. The production apparatus is collaterally provided with various devices mentioned later according to necessity.

The production apparatus is transported by an ordinary transportation vehicle, such as a truck, to the place where the flocculant is used, and produces a flocculant from the following raw materials on the vehicle or at an appropriate place where the apparatus is set down from the vehicle and where the use of the flocculant is needed.

The raw materials for production can be, for example, a commercially available high-concentration inorganic acid aqueous solution, such as of concentrated sulfuric acid, (about 75 to 98%), a commercially available high-concentration silicate aqueous solution having a concentration of about 28 to 40%, and a commercially available ferric chloride aqueous solution (about 37%). These raw materials are transported together with or separately from the production apparatus and supplied to the production apparatus on arrival. The water can be irrigation water or the like, which can easily be sourced locally in most cases. Therefore, the costs for transporting the water can be reduced. Of course, the water can be transported together with the raw materials according to necessity.

To produce the flocculant, the high-concentration inorganic acid aqueous solution and the high-concentration silicate aqueous solution are firstly diluted with water to a concentration suitable for production of the raw silica sol. The dilution is conducted in the storage tank 5 for the inorganic acid aqueous solution and in the storage tank 5' for the silicate aqueous solution. To dilute these solutions with water, irrigation water or the like sourced from an outside source can be used. Before supplied to the production apparatus, the water preferably passes through a water-pressure controller 11 or a device that controls water pressure and a flow rate by means of a water-supply valve (not shown). To attain a uniform concentration of the diluted solutions, the storage tanks are preferably provided with a stirring device (not shown).

The inorganic acid aqueous solution and the silicate aqueous solution, which have been diluted to a concentration suitable for production of the raw silica sol, are collided with each other at a rate of 5 m/sec or more by the collision device 8 and react with each other to form a silica sol. The collision device 8 is composed of a collision section 12 (as in the Y-shaped apparatus of FIG. 1) and pumps 6, 6' to eject the inorganic acid aqueous solution and the silicate aqueous solution respectively at a rate of 5 m/sec or more. As the collision device 8, the Y-shaped apparatus is preferable because of its simple structure and easy miniaturization. The pumps can be conventional ones. The amounts of the inorganic acid aqueous solution and the silicate aqueous solution ejected for collision are adjusted appropriately to make the $SiO_2$ concentration in the silica sol 100 to 200 g/L.

The raw silica sol obtained in the above process is directly sent to the stirring and aging tank 7 and aged there. The aging is, as previously said, continued until the viscosity of the silica sol becomes 6 to 30 cp. The stirring and aging tank 7 is provided with a stirring device 13 to stir the aging silica sol and a viscometer 14 to monitor the viscosity. Preferably, the stirring and aging tank is further provided with a thermometer 15 and a pH meter (not shown) for monitoring these properties.

The (aged) silica sol, which has been aged while being stirred to have a targeted viscosity of 6 to 30 cp, is drawn through a discharge pipe 16 (and 20) and sent to a flocculant final preparation tank (storage tank) 19. The draw can be made by means of a pump 17 as illustrated, or, depending on the case, under favor of gravity free-fall.

As described earlier, the aged silica sol is preferably diluted with water to an $SiO_2$ concentration of 50 to 70 g/L before mixed with the metal salt aqueous solution. The dilution can be conducted in the stirring and aging tank 7 or in the flocculant final preparation tank 19. Preferably, the aged silica sol is moved to the flocculant final preparation tank 19 and thereafter the dilution water is poured into the flocculant final preparation tank 19 via the stirring and aging tank 7, the discharge pipe 16 (and 20) and the pump 17. Such dilution is preferable because the travel of the dilution water can wash the stirring and aging tank 7, the discharge pipe 16 (and 20) and the pump 17 and the size of the stirring and aging tank 7 can be relatively small. The dilution water can be sourced from an outside source and supplied through the water-pressure controller 11, just as with the dilution of the inorganic acid aqueous solution and the silicate aqueous solution.

Next, by means of the feeding device 10, the metal salt aqueous solution that has been stored in the storage tank 9 for the metal salt aqueous solution is supplied to the aged silica sol whose $SiO_2$ concentration has been adjusted to 50 to 70 g/L. The feeding device 10 is not particularly limited as long as it has a function of supplying the metal salt aqueous solution to the device that performs mixing of the aged silica sol with the metal salt aqueous solution. Preferably, the feeding device is composed of, as illustrated, a supply pipe 18 (and 20) to supply the metal salt aqueous solution, a valve 21 and a pump 22 because of a simple structure. The supply pipe 18 is preferably connected to the aged silica sol discharge pipe 16 at somewhere along the discharge pipe 16 for simple piping. In this case, a pipe 20 in the figure functions as both the discharge pipe 16 for the aged silica sol and the supply pipe 18. Of course, there is no problem in pouring the metal salt aqueous solution into the flocculant final preparation tank 19 directly through a pipe 20' illustrated by broken lines or via the stirring and aging tank 7 through a pipe 20". It is also possible to supply the metal salt aqueous solution under favor of gravity free-fall without the pump 22.

Otherwise, the mixing can be achieved by such a method as previously supplying the metal salt aqueous solution to the flocculant final preparation tank 19 and, thereto, adding the aged silica sol, or by supplying the metal salt aqueous solution to the stirring and aging tank 7 to mix it with the aged silica sol.

As described earlier, the aged silica sol mixed with the metal salt aqueous solution is preferably diluted again with water to SiO$_2$ concentration of 10 to 30 g/L before used as a flocculant for water treatment. The dilution can be conducted in the final preparation tank 19. The final preparation tank 19 can be, for example, an ordinary large tank. Unlike all the devices constituting the production apparatus 24 (a section encircled in a broken line), i.e., the raw material storage tanks, the collision device, the stirring and aging tank, the feeding device for the metal salt aqueous solution and the collateral pipes, the final preparation tank 19 can be readily provided at the place where the flocculant for water treatment is used and need not be transported with these devices. Therefore, the apparatus that should be transported to produce a flocculant for water treatment at the place where it is used can be miniaturized and its weight can be saved. This is a very significant advantage of the production process of the present invention in view of the fact that, in a conventional method where a silica gel having an SiO$_2$ concentration of about 1 to 6% is necessarily aged at around 60° C., such an extremely large apparatus is required to produce the same amount of a flocculant for water treatment as produced by the process of the present invention that the apparatus for conventional method cannot be virtually transported.

The flocculant for water treatment can be diluted to an SiO$_2$ concentration of 10 to 30 g/L by direct addition of water to the final preparation tank 19. Preferably, the dilution is made by pouring the dilution water into the stirring and aging tank 7 and running the water through the discharge pipe 16 into the final preparation tank 19. Such dilution is preferable because the effect of washing the devices can be attained. It is preferable to provide the final preparation tank 19 also with a stirring device 23 to realize a uniform state as a whole of the flocculant for water treatment.

The size of the raw material storage tanks, the stirring and aging tank and other devices is not particularly limited. Preferably, in view of easy transportation and quantitatively sufficient production of the flocculant for water treatment, the inorganic acid aqueous solution storage tank and the metal salt aqueous solution storage tank are of a size about 50 to 500 L (more preferably about 100 to 300 L), the silicate aqueous solution storage tank is of a size about 100 to 600 L (more preferably about 150 to 400 L) and the stirring and aging tank is of a size about 100 to 600 L (more preferably about 300 to 500 L). These capacities enable producing the flocculant for water treatment as much as 1000 to 10000 L per batch. The size of other devices can be determined appropriately in conformity with these raw material storage tanks and the stirring and aging tank.

Preferably, the pipes are appropriately provided with various pumps and flow control devices (e.g., valves) according to necessity.

In order to prevent the raw materials from being frozen and the aging rate from being lowered when the apparatus is used in a cold district in winter, a heater (not shown) or the like is preferably provided to warm the water supplied from the water-pressure controller 11 to each device and to prevent the stirring and aging tank 7 from being overcooled.

Although not illustrated, the apparatus for producing a flocculant for water treatment of the present invention is generally provided with various control devices to measure and monitor the flow rates of water and of silica sol, the viscosity of the flocculant, the temperature, pH, etc., and control each device according to necessity.

The electric source to operate the stirring device, the pumps and the control devices can be an outside electric source that is provided at the place where the flocculant for water treatment is produced (the place where the production apparatus is operated) or an electric motor or the like that is transported with the production device.

After production of the flocculant for water treatment in the above manner, the production device 24 is according to necessity transported to another place by such a delivery means as a truck and, there, produces the flocculant for water treatment in the above manner. To ease work, such as transportation by a truck, loading and unloading of the apparatus and set-up at the time of use, the components constituting the apparatus 23 for producing a flocculant for water treatment (i.e., the raw material storage tanks, the collision device, the stirring and aging tank, the feeding device for feeding the metal salt aqueous solution and the collateral pipes) are preferably united by a conventional method. In this case, although the component devices can be united by such a conventional means as welding to achieve their mutual connection hardly separable, they are preferably united by mechanical fasteners, such as screws, bolts and nuts, to enable easy replacement of the devices in the case of repair and refurbishment. In such a case, of course, various metal frames and metal plates can be used to reinforce the strength.

The flocculant for water treatment can be used as it is or may be stored in the final preparation tank (storage tank) 19 and used as needed. When the stock in the storage tank has come close to an end, the production apparatus 24 is again transported and the flocculant is produced and refills the storage tank.

The flocculant obtained by the production apparatus or a different production apparatus in accordance with the production process of the present invention is generally used to coagulate and deposit pollutants, e.g., suspended substances, in river water for water supply and in wastewater. The amount of the flocculant is usually 3 to 6 mg/L in terms of Fe, depending on the quantity of pollutants in the water.

EXAMPLES

Hereinafter, the present invention will be described in more detail with reference to the following examples, but it is not limited to the examples.

In the examples and comparative examples, the experimental methods are as follows.

a) Preparation of silica sol as a starting material:

Using a Y-tube reactor as shown in FIG. 1 equipped with a a sodium silicate aqueous solution-feeding tube having a choke part of a 1.2 mmφ×10 mm long tube and a sulfuric acid aqueous solution-feeding tube having a choke part of a 1.4 mmφ×10 mm long tube, the silica sol was prepared at a starting material concentration and a flow rate as shown in each of Examples and Comparative Examples.

b) The viscosity was determined at 20° C. with a BL viscometer manufactured by Tokyo Keiki Seisakusho Co.

c) Coagulation performance:

River water drawn from Tama River and commercially available kaolin (ASP-072 manufactured in ENGEL HARD CO.) were mixed and regulated to prepare a test water having a turbidity of from 23 to 26 degree. The test water 1000 ml was put on a 6 jars connected tester, 4 or 5 mg in terms of Fe of a flocculant was added based on 1 liter of water and stirred at a stirring rate of 150 rpm for 3 min to produce flocs. Successively, the test water was stirred at a stirring rate of 50 rpm for 10 min, and was allowed to stand still for 10 min. Thereafter, 300 ml of the supernatant liquid was collected and the turbidity and pH thereof were measured using a turbidimeter (SEP-PT-706D) manufactured by Nikken Labo Co. and a pH meter.

Example 1

To a Y-tube reactor, a sulfuric acid aqueous solution having a concentration of 3.6N and a sodium silicate aqueous solution having a $SiO_2$ concentration of 298 g/L were fed respectively at a rate of 1 l/min, and 10 liter of a raw silica sol was obtained. The flow rates of the sulfuric acid and sodium silicate fed to the reactor were 10.8 m/sec and 14.7 m/sec respectively.

The raw silica sol fed in a sol storage tank from a sol discharge tube has a $SiO_2$ concentration of 150 g/L and a viscosity of 5.0 cp. The temperature of the resulting silica sol was 33° C.

From the raw silica sol (the starting material silica sol) having a $SiO_2$ concentration of 150 g/L and a viscosity of 5.0 cp, 1 liter was collected and aged with gentle stirring at room temperature (about 23° C.) for 120 min to prepare an aged silica sol having a viscosity of 10 cp. The aged silica sol was diluted with water to make a silica sol having a $SiO_2$ concentration of 60 g/L. Thereafter the silica sol was mixed with 88 ml of a 37% ferric chloride. In this mixing, the molar ratio of Si/Fe was 3. Further, the silica sol was diluted with water, to make a flocculant having a $SiO_2$ concentration of 20 g/L and a pH of 1.3. The coagulation performance of the flocculant was measured.

The results are shown in Table 1.

Example 2

A flocculant was prepared in the same manner as in Example 1 except that the aging time was 180 min and an aged silica sol having a viscosity of 19.5 cp was obtained. The coagulation performance of the flocculant was measured.

The results are shown in Table 1.

Example 3

A raw silica sol having a $SiO_2$ concentration of 110 g/L and a viscosity of 3 cp was prepared using a sulfuric acid aqueous solution having a concentration of 2.4 N and a sodium silicate aqueous solution having a $SiO_2$ concentration of 230 g/L in the same manner as in Example 1.

The procedure of Example 1 was repeated except that the starting material silica sol was aged for 180 min to make an aged silica sol having a viscosity of 7 cp, resulting in flocculant having a molar ratio of Si/Fe of 3, a $SiO_2$ concentration of 20 g?l and a pH of 1.4.

The coagulation performance of the flocculant was measured.

The results are shown in Table 1.

Examples 4 and 5

A flocculant having a molar ratio of Si/Fe of 3, a $SiO_2$ concentration of 20 g/L and a pH of 1.3 was prepared in the same manner as in Example 1 except that the raw silica sol was aged to make an aged silica sol having a viscosity of 10 cp and a ferric chloride aqueous solution was added to the aged silica sol without dilution with water. The coagulation performance of the flocculant was measured. The results are shown in Table 1.

As is clear from Table 1, between Examples 4 and 5, the amounts of the flocculants added to the test waters were different.

Comparative Example 1

A flocculant having a molar ratio of Si/Fe of 3, a $SiO_2$ concentration of 20 g/L and a pH of 1.3 was prepared in the same manner as in Example 1 except that the raw silica sol was aged for 10 min to make an aged silica sol having a viscosity of 5 cp. The coagulation performance of the flocculant was measured. The results are shown in Table 2.

Comparative Example 2

A flocculant having a molar ratio of Si/Fe of 3, a $SiO_2$ concentration of 20 g/L and a pH of 1.3 was prepared in the same manner as in Example 1 except that the raw silica sol was aged for 210 min to make the aged silica sol having a viscosity of 38 cp. The coagulation performance of the flocculant was measured. The results are shown in Table 2.

Comparative Example 3

The aged silica sol having a viscosity of 38 cp (aging time: 210 min) prepared in the same manner as in Comparative Example 2 was mixed with the aged silica sol having a viscosity of 5 cp (aging time: 10 min) prepared in the same manner as in Comparative Example 1, to prepare a mixed silica sol having a viscosity of 10 cp and a $SiO_2$ concentration of 150 g/L.

A flocculant having a molar ratio of Si/Fe of 3, a $SiO_2$ concentration of 20 g/L and a pH of 1.3 was prepared in the same manner as in Example 1 except that 1 liter of the mixed silica sol was used as an aged silica sol. The coagulation performance of the flocculant was measured. The results are shown in Table 2.

Comparative Example 4

To a Y-tube reactor, a sulfuric acid aqueous solution having a concentration of 8.5 N at a flow rate of 0.53 l/min (5.7 m/sec) and a sodium silicate aqueous solution having a $SiO_2$ concentration of 298 g/L at a flow rate of 1.3 l/min were fed respectively, and a starting material silica sol having a $SiO_2$ concentration of 225 g/L and a viscosity of 5.7 cp was obtained in the same manner as in Example 1.

The starting material silica sol was aged at room temperature for 3 min to make an aged silica sol having a viscosity of 19.5 cp. Using the aged silica sol, a flocculant having a molar ratio of Si/Fe of 3, a $SiO_2$ concentration of 20 g/L and a pH of 1.1 was prepared in the same manner as in Example 1. The coagulation performance of the flocculant was measured. The results are shown in Table 2.

Comparative Example 5

A starting material silica sol having a $SiO_2$ concentration of 50/L and a viscosity of 1.5 cp was prepared using a sulfuric acid aqueous solution having a concentration of 1.5 N and a sodium silicate aqueous solution having a $SiO_2$ concentration of 135 g/L in the same manner as in Example 1.

The starting material silica sol was aged at room temperature for 120 min to make an aged silica sol having a viscosity of 1.5 cp. Using the aged silica sol, a flocculant having a molar ratio of Si/Fe of 3, a $SiO_2$ concentration of 20 g/L and a pH of 1.3 was prepared in the same manner as in Example 1. The coagulation performance of the flocculant was measured. The results are shown in Table 2.

Comparative Example 6

A starting material silica sol having a $SiO_2$ concentration of 50/L and a viscosity of 1.5 cp prepared by the method in Comparative Example 5 was aged at room temperature for 270 min, but the silica sol still had a viscosity of 1.5 cp.

The silica sol was further aged at room temperature for 19.5 hr (total ageing time: 24 hr) but the resulting silica sol had a viscosity of only 2 cp.

TABLE 1

|  | Example | | | | |
| --- | --- | --- | --- | --- | --- |
|  | 1 | 2 | 3 | 4 | 5 |
| Starting material silica sol $SiO_2$ concentration (g/L) | 150 | 150 | 110 | 150 | 150 |
| Starting material silica sol Viscosity (cp) | 5 | 5 | 3 | 5 | 5 |
| Aging time (min) | 120 | 180 | 180 | 120 | 120 |
| Aged silica sol Viscosity (cp) | 10 | 19.5 | 7 | 10 | 10 |
| Water dilution after aging | Done | Done | Done | Not done | Not done |
| Flocculant injecting amount (mg—Fe/L) | 4 | 4 | 5 | 4 | 5 |
| Supernatant liquid Turbidity | 0.45 | 0.65 | 0.55 | 0.83 | 0.53 |
| Supernatant liquid pH | 6.60 | 6.62 | 6.57 | 6.55 | 6.53 |

TABLE 2

|  | Comparative Example | | | | | |
| --- | --- | --- | --- | --- | --- | --- |
|  | 1 | 2 | 3 | 4 | 5 | 6 |
| Starting material silica sol $SiO_2$ concentration (g/L) | 150 | 150 | 150 | 225 | 50 | 50 |
| Starting material silica sol Viscosity (cp) | 5 | 5 | 5 + 38 * | 5.7 | 1.5 | 1.5 |
| Aging time (min) | 10 | 210 | — | 3 | 120 | 1440 |
| Aged silica sol Viscosity (cp) | 5 | 38 | (10) | 19.5 | 1.5 | 2 |
| Water dilution after aging | Done | Done | Done | Done | Done | — |
| Flocculant injecting amount (mg—Fe/L) | 5 | 4 | 4 | 4 | 4 | — |
| Supernatant liquid Turbidity | 1.77 | 1.65 | 1.71 | 12.32 | 11.54 | — |
| Supernatant liquid pH | 6.49 | 6.53 | 6.52 | 6.61 | 6.72 | — |

Note)
* The silica sol having a viscosity of 5 cp and the silica sol having a viscosity of 38 cp were mixed.

EFFECT OF THE INVENTION

Using the process wherein the starting material silica sol having a specific concentration is used and aged to make an aged silica sol having a viscosity of 6 to 30 cp according to the present invention, a flocculant having high coagulation performance for water treatment can be prepared in a high concentration, namely in a high yield per batch. Therefore, the flocculant can be prepared at low cost industrially. Further, in the process, a special heating device is unnecessary for aging. From the viewpoint of these, the production cost of the flocculants can be decreased.

Moreover, employing the process comprising colliding an inorganic acid aqueous solution with a silicate aqueous solution at a prescribed or higher rate extremely facilitates the stable continuous production of the starting material silica sol having the specific concentration. In the process, a high-speed stirrer or the like is unnecessary so that the production cost of the silica sol can be further decreased.

Therefore, the processes of the present invention are extremely useful as an industrial process for preparing flocculants for water treatment.

The invention claimed is:

1. A process for preparing a flocculant for water treatment, which process comprises:
    preparing a starting silica sol having a concentration of from 100 to 200 g/L and a viscosity of less than 6 cp by colliding an inorganic acid aqueous solution with a silicate aqueous solution at a rate of 5 m/sec or more in a Y-tube reactor,
    aging said starting silica sol to prepare an aged silica sol having a $SiO_2$ concentration of from 100 to 200 g/L and a viscosity of from 6 to 30 cp, and
    mixing the aged silica sol with a water-soluble metal salt.

2. The process for preparing a flocculant for water treatment according to claim 1, wherein said starting silica sol has a $SiO_2$ concentration of from 140 to 160 g/L.

3. The process for preparing a flocculant for water treatment according to claim 1, wherein said starting silica sol has a $SiO_2$ concentration of from 100 to 160 g/L and said aged silica sol has a $SiO_2$ concentration of 100 to 160 g/L.

4. The process for preparing a flocculant for water treatment according to claim 1, wherein said aged silica sol has a viscosity of from 6 to 20 cp.

5. A process for preparing a flocculant for water treatment, which process comprises:
    preparing a starting silica sol having a $SiO_2$ concentration of from 100 to 200 g/L and a viscosity of less than 6 cp by colliding an inorganic acid aqueous solution with a silicate aqueous solution at a rate of 5 m/sec or more in a Y-tube reactor,
    aging said starting silica sol to prepare an aged silica sol having a $SiO_2$ concentration of from 100 to 200 g/L and a viscosity of from 6 to 30 cp,
    diluting the aged silica sol with water to prepare a diluted silica sol having a $SiO_2$ concentration of from 50 to 70 g/L, and
    mixing the diluted silica sol with a water-soluble metal salt.

6. The process for preparing a flocculant for water treatment according to claim 5, wherein said starting silica sol has a $SiO_2$ concentration of from 140 to 160 g/L.

7. The process for preparing a flocculant for water treatment according to claim 5, wherein said starting silica sol has a $SiO_2$ concentration of from 100 to 160 g/L and said aged silica sol has a $SiO_2$ concentration of 100 to 160 g/L.

8. The process for preparing a flocculant for water treatment according to claim 5, wherein said aged silica sol has a viscosity of from 6 to 20 cp.

* * * * *